United States Patent Office 3,250,813
Patented May 10, 1966

3,250,813
PRODUCTION OF ALLYL ETHERS
Robert James Stephenson, Cwmbran, England, assignor to Monsanto Chemicals Limited, London, England, a British company
No Drawing. Filed July 11, 1961, Ser. No. 123,132
Claims priority, application Great Britain, July 13, 1960, 24,386/60; Feb. 16, 1961, 5,789/61
7 Claims. (Cl. 260—614)

This invention relates to an improved process for the production of ethers, and in particular for the production of allyl ethers, and of polymers derived from them.

Ethers containing allyl groups are useful industrial products, owing to the reactivity of the allyl groups. Apart from general applications as chemical intermediates, allyl ethers are of particular interest as monomers which can be polymerised either alone or with vinyl monomers, for instance ethylene, styrene or acrylonitrile.

Certain allyl ethers, in particular for instance an allyl ether which as well as containing an ethylenic group also contains a hydroxyl group, are of value as for example cross-linking agents in the production of many kinds of resins, such as polyester and alkyd resins. Moreover, polymers obtained from an allyl ether that also contains a hydroxyl group have hydrophilic properties, and can be made use of in certain specialised applications, for instance as stabilisers in an emulsion polymerisation process.

A very effective method of making allyl ethers has now been found.

The process of the present invention is one for the production of an allyl ether, in which an allyl alcohol is reacted with itself or with another alcohol in the presence as catalyst of a cuprous salt and as co-catalyst of a trivalent inorganic acid, a Lewis acid, a sulphonic acid or an acid ion-exchange resin.

Where an allyl alcohol is reacted alone the product is of course a diallyl ether. Where for example an aliphatic alcohol is also present the ether contains one allyl group and one aliphatic group.

Certain of the ethers which can be produced by the process of the invention are new compounds and are claimed as such; these are the allyl ethers of neopentyl glycol.

The process works well with allyl alcohol itself, but other allyl alcohols which give good results are for instance those of general formula:

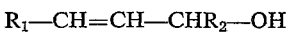

$R_1$—CH=CH—CHR$_2$—OH where $R_1$ is a hydrogen atom, a hydrocarbon group or a substituted hydrocarbon group having for instance up to 30 carbon atoms, and $R_2$ is a hydrogen atom, an alkyl group, an alkenyl group, or a substituted alkyl or alkenyl group, having for instance up to 10 carbon atoms, or where $R_1$ and $R_2$ together with the

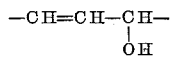

—CH=CH—CH—
              |
              OH radical form an alicyclic ring; preferably when $R_1$ is a hydrogen atom $R_2$ is also a hydrogen atom.

Where in the above formula $R_1$ is a hydrocarbon group it can for example be an aliphatic group with either a straight or branched chain, and can be fully saturated or have one or more multiple carbon-carbon bonds. The aliphatic group is preferably one having up to 20 carbon atoms. Thus $R_1$ can for example be an alkyl group such as a methyl, ethyl, propyl, butyl, amyl, hexyl, octyl, decyl, dodecyl, octadecyl or eicosyl group, or an alkenyl group such as a vinyl, propenyl, isobutenyl, 1,3-pentadienyl, octenyl, decenyl, tetradecenyl or octadecenyl group. Alternatively $R_1$ can be a cyclic group, generally one having from 5 to 7 carbon atoms, for example a cyclopentyl, cyclohexyl, cyclohexenyl or cycloheptyl group, an aralkyl group having up to 10 carbon atoms, such as a benzyl, β-phenethyl or phenylbutyl group, or an aryl group such as a phenyl, tolyl or xylyl group.

Where $R_1$ is a substituted hydrocarbon group the substituent can be either inert, that is one which remains substantially unaffected during the reaction of the allyl alcohol, or reactive. An alkyl group (generally one having up to four carbon atoms, for example methyl or ethyl) which can occur as a substituent when $R_1$ is a cyclic hydrocarbon group, is an example of the former type of substituent. Further examples are the alkoxy group in substituted hydrocarbon groups such as p-ethoxyphenyl, butoxycyclohexyl or 4-methoxybutyl and the nitro group in for example o-nitrophenyl.

When the substituent is reactive it will in general be a hydroxyl group attached to an aliphatic or an alicyclic group or alternatively a precursor which is converted to a hydroxyl group under the conditions of the reaction. $R_1$ can then be a group such as hydroxymethyl, bromomethyl, β-hydroxyethyl or α-hydroxypropenyl. In such cases the allyl alcohol is in effect dihydric. Both hydroxyl groups can then be involved in the formation of ether linkages, and the main product can, under appropriate conditions, be a polyether.

When $R_2$ in the above formula of the allyl alcohol is an alkyl or alkenyl group, it is preferably one containing not more than four carbon atoms, for example a methyl, ethyl, n- or isopropyl, n- or s-butyl, vinyl or butentyl group. Where $R_2$ is a substituted alkyl or alkenyl group, the substituent can be for example a halogen atom, such as chlorine, a nitro group, a hydroxyl group, or an alkoxy group, such as methoxy, ethoxy or butoxy.

When $R_1$ and $R_2$ form part of an alicyclic ring, this will in general be a 5-, 6-, or 7-membered ring, in which case the allyl alcohol will be a cyclopentenol, a cyclohexenol or a cycloheptenol.

The following are specific examples of the allyl alcohols which can be employed in the process of the invention: allyl alcohol; crotyl alcohol; 5-methyl-2-hexen-1-ol; 2,4-pentadien-1-ol; 3-penten-2-ol; 3,5-hexadien-2-ol; 3-cyclohexylallyl alcohol; 3-benzylallyl alcohol; cinnamyl alcohol; o-nitrocinnamyl alcohol; p-ethoxycinnamyl alcohol; 4-chloro-2-buten-1-ol; 2-buten-1,4-diol monoethyl ether; 2-buten-1,4-diol; 2,4-hexadien-1,6-diol; cyclohex-2-en-1-ol; 4-isopropylcyclohex-2-en-1-ol; and cyclohex-2-en-1,4-diol.

Where an allyl alcohol is reacted with itself this includes the case where two different allyl alcohols are present, so that an unsymmetrical diallyl ether is produced.

Where the allyl alcohol is reacted with a different alcohol that is to say a non-allylic alcohol, this can be chosen from a wide range including mono- and polyhydric alcohols having for instance up to 30 carbon atoms. A polyhydric alcohol is generally one having from two to six hydroxyl groups. Preferably the non-allylic alcohol is primary or secondary.

Thus the alcohol can be for instance an aliphatic alcohol having a straight, branched or cyclic chain, preferably of up to 20 carbon atoms which can for example be fully saturated or contain one or more multiple carbon-carbon bonds, or be interrupted by other atoms such as oxygen or sulphur, or carry one or more substituent atoms or groups other than the alcoholic hydroxyl group. A substituent can be for example an alkyl group, particularly one having up to four carbon atoms, such as ethyl or propyl, a nitro group, a halogen atom, such as chlorine or bromine, a hydroxyl group, an alkoxy group having up to four carbon atoms, for example methoxy, ethoxy or butoxy, or a hydroxyalkoxy group having up to four carbon atoms, for example hydroxymethoxy or hydroxypropoxy.

Examples of such aliphatic alcohols that are monohydric include methanol, ethanol, n- and iso-propanol, n-, iso-, and s-butanol; amyl, hexyl, octyl, nonyl, decyl, dodecyl, hexadecyl, and eicosyl alcohols; 3-buten-1-ol and 4-penten-2-ol; oleyl alcohol; 2-chloroethanol; 1-bromopropan-2-ol; ethylene glycol monobutyl ether, octadecamethylene glycol monopropyl ether; and diethylene glycol monoethyl ether.

Other useful aliphatic alcohols also include those having a cyclic structure, generally of from 5 to 7 carbon atoms for example cyclopentanol, cyclohexanol, cyclohex-3-en-1-ol; 2-ethylcyclohexanol, and 4-chlorocyclohexanol, as well as aralkyl alcohols having for instance from 7 to 10 carbon atoms, for example benzyl alcohol, nuclear substituted benzyl alcohols, such as p-nitrobenzyl alcohol, and phenylbutanol.

Examples of alcohols that are polyhydric include dihydric alcohols, such as ethylene glycol, polyethylene glycols of the general formula $HO(CH_2CH_2O)_nCH_2CH_2OH$, where $n$ is for instance an integer from 1 to 10, propane-1,2-diol, propane-1,3-diol, butane-1,4-diol, 3-methylpentane-2,5-diol, neopentyl glycol, hexamethylene glycol and hexadecamethylene glycol; trihydric alcohols, for instance glycerol; tetrahydric alcohols, for instance erythritol and pentaerythritol; pentahydric alcohols, for instance arabinol; hexahydric alcohols, for instance mannitol and sorbitol; and carbohydrates, for instance glucose and sucrose.

The cuprous salt catalyst which is employed in the process of the invention can for example be a cuprous halide such as the chloride or bromide, cuprous sulphate, cuprous acetate or cuprous p-toluenesulphonate.

Where the co-catalyst is a trivalent inorganic acid this can be for instance phosphoric acid.

Where the co-catalyst is a Lewis acid it can for instance be a halide of an element in Group III of the Periodic Table, for example boron trifluoride or aluminium chloride.

Where the co-catalyst is a sulphonic acid, this can be an inorganic sulphonic acid, such as sulphuric acid or sulphamic acid; an organic sulphonic acid, such as benzenesulphonic acid; p-toluenesulphonic acid, methanesulphonic acid or ethyl hydrogen sulphate; or a resin containing a plurality of sulphonic acid groups, for instance a sulphonated styrene polymer or copolymer, several of which are available commercially as ion-exchange resins. The sulphonated resins are particularly effective as co-catalysts in the process of the invention, as are other acid ion-exchange resins.

The cuprous salt is usually added to the reaction mixture as the powdered solid, although it can in appropriate instances be formed in situ from copper powder or cuprous oxide or hydroxide and the acid which is employed as the co-catalyst. It is also possible to introduce the cuprous salt as a complex such as a halocuprous acid, or as an ion-exchange resin in which cuprous ions from a cuprous salt have displaced hydrogen ions originally present in an acidic ion-exchange resin. Particularly useful is a resin containing a plurailty of sulphonic groups some of which are present as cuprous sulphonate groups and the remainder as sulphonic acid groups; the resin can accordingly function as both catalyst and co-catalyst.

The acid co-catalyst can be added as a solid or liquid (in instances where these forms are appropriate). Thus the co-catalyst can be in solution, for instance either aqueous or in one or both of the reactant alcohols. In solution in one of the alcohols the acid will sometimes be present to some extent as an ester; thus a solution of sulphuric acid in ethanol will contain ethyl hydrogen sulphate, whilst a solution in allyl alcohol will also contain the appropriate ester. If desired the acid co-catalyst can be added in the form of a hydrolysable organic ester such as for instance a sulphate. Boron trifluoride is most conveniently introduced as a complex such as the boron trifluoride-ethyl ether or the boron trifluoride-ethyl acetate complex.

The proportion of cuprous salt employed relative to the amount of the allyl alcohol can be as much as 0.5 mol. per mol. of allyl alcohol, but such large amounts are generally unnecessary since as little as 0.00001 mol. per mol. of allyl alcohol can be effective in some instances. Generally a molar ratio of cuprous salt to allyl alcohol within the range 0.001:1 to 0.1:1 is preferred, for example from 0.01:1 to 0.05:1.

The ratio of acid co-catalyst to cuprous salt employed can vary over a wide range, for instance from about 0.1 to about 50 equivalents of the acid per mol. of cuprous salt. The preferred range of ratios is generally from 0.2 to 10 equivalents of the acid per mol. of cuprous salt, and mixtures having a number of equivalents of acid within the range 0.4 to 7.5, for example 0.5, 1, 2, 3 and 5, per mol. of cuprous salt have been employed very successfully. When sulphuric acid is used as the co-catalyst, better results are obtained if the cuprous salt is present in excess, that is if at least one mol. of cuprous salt is employed for each mol. of sulphuric acid. With this acid the preferred ratios are accordingly within the range 0.4 to 2 equivalents per mol. of cuprous salt. A resin which can function as both catalyst and co-catalyst and in which there are for instance three equivalents of acid per mol. of cuprous salt, can be obtained by treating a resin containing a plurality of sulphonic acid groups with a quantity of a cuprous salt sufficient to displace one quarter of the original number of hydrogen ions by cuprous ions.

When the process of the invention is applied to the production of a mixed ether, then the allyl alcohol and the non-allylic alcohol can be employed in equivalent molar amounts, or either can be in excess relative to the other. Whether in any particular instance an excess of one alcohol should be employed will usually be determined by such factors as the relative costs of the two alcohols, the ease of isolation of the ether in the presence of the unreacted excess of the alcohol, or (where the other alcohol is polyhydric) by the degree of etherification required. An excess, if employed, can be as little as 10% or as much as perhaps 50%, 100%, or 200%.

In general, the process of the invention is carried out by heating the allyl alcohol (or a mixture of the allyl alcohol and the other alcohol), the cuprous salt and the acid co-catalyst under conditions where the continuous removal of water from the system is possible. This can conveniently be effected by arranging for the formation of an azeotrope of water with one or more of the components of the reaction system. In certain cases the component which forms the azeotrope will be a reactant or a product; n-butanol for example, which is used as a reactant in the production of allyl n-butyl ethers, and di-allyl ether both form such azeotropes. If none of the reactants or products performs this function, then an inert component such as benzene or toluene can be added for the purpose. The reaction is usually carried out at the boiling point of the mixture and arrangements are made to condense the distillate and to collect it in a suitably constructed receptacle in which it can separate into an aqueous and an organic layer and from which the latter can be returned to the reaction mixture.

The time required to complete the reaction will depend on several factors including the reactivity of the alcohol or alcohols employed, and the proportions of the reactants, the cuprous salt and the acid co-catalyst. The course of a batch reaction can however be followed by observing the rate at which water is evolved, and when this becomes very slow, say less than 2% of the original rate, or when say 90% of the theoretical amount of water has been collected, the reaction can be terminated and the product isolated. In certain circumstances, for example if the reaction is carried out continuously, it may be more expedient to terminate the reaction earlier and to separate and recycle unchange starting-materials.

Where the required product is an allyl ether which as well as containing an ethylenic group also contains a hydroxyl group the starting-materials are an allyl alcohol and a polyhydric alcohol, and the process is operated so that etherification of the polyhydric alcohol is incomplete. The etherification of the polyhydric alcohol with the allyl alcohol normally takes place in stages, and after the first hydroxyl group the reaction of a given hydroxyl group generally occurs considerably more slowly than the reaction of the preceding group. Frequently this permits the selection of conditions, for example in certain instances a moderately elevated reaction temperature of perhaps 60–90° C., where the reaction virtually ceases without any significant amount of a fully allylated product being formed, even in the presence of an excess of the allyl alcohol. In other instances, a partially allylated product can be obtained simply by stopping the reaction after the appropriate amount of by-product water has been produced, or for example by employing a deficiency of the allyl alcohol.

The complete etherification of a polyhydric alcohol with an allyl alcohol to give a polyether is practical, but this often calls for the use of more drastic conditions, including for example a relatively high reaction temperature of perhaps 100–150° C.

The reaction is generally terminated by removing the acid co-catalyst from the reaction system, conveniently by mechanical separation when the co-catalyst is an insoluble resin, or in appropriate instances by neutralisation of the acid with a base. Fractional distillation of the reaction product, optionally after filtration to remove solid material, is often a convenient procedure for the isolation of the required product. In general however any appropriate method of isolation can be employed, and such a method need not necessarily entail distillation.

The invention is illustrated by the following examples.

*Example 1*

This example describes the preparation of diallyl ether from allyl alcohol, using cuprous chloride as catalyst with sulphuric acid as the co-catalyst.

9.8 grams (0.2 equivalent) of 98% w./w. sulphuric acid were cautiously added to a solution of 9.9 grams (0.1 mol.) of cuprous chloride in 290 grams (5.0 mol.) of allyl alcohol. The resulting solution was boiled in a 1 litre flask fitted with a reflux condenser and a "Dean and Stark" type water separator. Water was collected during the reaction period of 10 hours, the total volume of water in the separator being 38 cc. The acid was then neutralised by the slow addition to the reaction mixture of a solution of 8 grams of sodium hydroxide in 20 cc. of water, and the water thus added was removed azeotropically. The dehydrated product was distilled at atmospheric pressure through a fractionating column to give 213 grams of a fraction boiling at 88 to 94° C. consisting essentially of diallyl ether.

*Example 2*

This example describes the preparation of diallyl ether from allyl alcohol using cuprous chloride as catalyst and a sulphonated ion-exchange resin as the co-catalyst.

A suspension of 15 grams (0.06 equivalent) of Amberlite IR 12OH (a sulphonated polystyrene cross-linked with 10% by weight of divinylbenzene) in a solution of 3 grams (0.03 mol.) of cuprous chloride in 232 grams (4.0 mol.) of allyl alcohol was stirred and boiled under reflux, using apparatus similar to that described in Example 1 but with the addition of a stirrer. A two-phase distillate was obtained after 30 minutes, and 46 cc. of an aqueous phase were collected during the following two hours. After cooling, the liquid was decanted from the solids in the reactor into a 500 cc. flask fitted with a fractionating column. On distillation, 163 grams of diallyl ether were collected as a fraction with boiling range 93–95° C. The still residue consisted of high-boiling by-products together with the catalyst. This residue was then transferred back to the reaction flask, and the reaction was repeated. Proceeding in this way, it was found possible to re-use the same portion of catalyst resin five times without the activity of the ion-exchange resin co-catalyst falling to an impracticably low level.

*Example 3*

This example describes the preparation of allyl n-butyl ether from allyl alcohol and n-butanol, using cuprous chloride as the catalyst and a sulphonated ion-exchange resin as the co-catalyst.

A mixture of 87 grams (1.5 mol.) of allyl alcohol, 74 grams (1.0 mol.) of n-butanol, 2 grams (0.02 mol.) of cuprous chloride, and 5 grams (20 milli-equivalents) of the sulphonated polystyrene resin of Example 2 was stirred and heated, using the apparatus described in the previous example. The temperature at which refluxing occurred initially was 99° C.; after 30 minutes this fell to 92° C., the boiling point of the water-azetrope. An aqueous phase was separated from the distillate during the next five hours, while the temperature at which refluxing occurred gradually increased. Although a slow evolution of water continued, the reaction was terminated when the reflux temperature reached 114° C., and the liquid reaction product was decanted from the solid catalyst. Fractional distillation at atmospheric pressure gave 85 grams of a main fraction with a boiling range of 114–119° C., consisting essentially of allyl n-butyl ether.

*Example 4*

This example describes the preparation of allyl s-butyl ether from allyl alcohol and s-butanol using cuprous chloride as the catalyst and a sulphonated ion-exchange resin as the co-catalyst.

A mixture of 70 grams (1.21 mol.) of allyl alcohol, 74 grams (1.0 mol.) of s-butanol, 2.5 grams (11 milli-equivalents) of Zeocarb SRC 225/12 (a sulphonated polystyrene cross-linked with 4½% by weight of divinylbenzene) and 0.25 gram (0.0025 mol.) of cuprous chloride was stirred and refluxed in an apparatus fitted with a water-separating still head. During 6 hours, 22.5 grams of an aqueous phase were separated from a two-phase distillate.

The liquid product was decanted from the solid resin and distilled through a fractionating column at atmospheric pressure. 89 grams of allyl s-butyl ether were obtained as a fraction having a boiling point of 97° to 108° C.

*Example 5*

105 grams of allyl benzyl ether having a boiling point of 100 to 106° C. at a pressure of 39 mm. of mercury were obtained by a procedure similar to that of the previous example, using 108 grams (1.0 mol.) of benzyl alcohol in place of the s-butanol of that example.

*Example 6*

This example describes the preparation of allyl cyclohexyl ether from allyl alcohol and cyclohexanol, using cuprous chloride as catalyst and p-toluenesulphonic acid as co-catalyst.

A mixture of 87 grams (1.5 mol.) of allyl alcohol, 100 grams (1.0 mol.) of cyclohexanol, 4 grams (0.04 mol.) of cuprous chloride and 19 grams (0.12 equivalent) of p-toluenesulphonic acid was refluxed for 3¼ hours; 28 cc. of an aqueous phase were separated from a two-phase distillate during this time. The reaction was terminated by adding a solution of 8 grams of sodium hydroxide in 15 cc. of water, and this water was then removed as an azeotrope with diallyl ether by continuing the refluxing for a further 2 hours. After cooling, the reaction product was filtered, and the filtrate was distilled at atmospheric pressure through a fractionating column. The main fraction (102 grams) had a boiling range of 150–170° C. and consisted essentially of allyl cyclohexyl ether.

Example 7

This example describes the preparation of allyl 2-chloroethyl ether from allyl alcohol and 2-chloroethanol, using cuprous chloride as the catalyst and a sulphonated ion-exchange resin as co-catalyst.

A mixture of 87 grams (1.5 mol.) of allyl alcohol, 80.5 grams (1.0 mol.) of 2-chloroethanol, 110 grams of benzene, 1.0 gram (0.01 mol.) of cuprous chloride and 5 grams (20 milli-equivalents) of the sulphonated polystyrene resin of Example 2 was refluxed with stirring for 5 hours, at the end of which time the production of water had virtually ceased.

The liquid product was decanted from the solid resin, and was distilled through a fractionating column at atmospheric pressure. 108 grams of allyl 2-chloroethyl ether were obtained as a fraction having a boiling point of 130–135° C.

Example 8

The example shows the use of a Lewis acid (boron trifluoride) as a co-catalyst in the production of diallyl ether from allyl ether, using cuprous chloride as catalyst.

A mixture of 1 gram mol. of allyl alcohol, 0.04 gram mol. of cuprous chloride and 0.025 gram mol. of boron trifluoride was refluxed for 4 hours, the by-product water being collected in a suitable still-head. Diallyl ether (30 grams) was obtained on working up the reaction mixture in the usual way.

Example 9

This example describes the preparation of neopentyl glycol monoallyl ether by the reaction of neopentyl glycol and allyl alcohol in the presence of cuprous chloride and a sulphonated ion-exchange resin under conditions where the main reaction was monoallylation of the glycol.

A mixture of 52 grams (0.55 mol.) of neopentyl glycol, 87 grams (1.5 mol.) of allyl alcohol, 80 grams of benzene, 5 grams (20 milli-equivalents) of the sulphonated polystyrene of Example 2 and 1 gram (0.01 mol.) of cuprous chloride was stirred under reflux using an apparatus fitted with a water-separating still head. 20 grams of an aqueous phase were separated from the distillate during 3½ hours.

The liquid product was decanted from the solid resin and distilled at atmospheric pressure to remove benzene and diallyl ether (the latter having to be formed as a by-product from the excess allyl alcohol). Distillation of the residue under reduced pressure gave 51 grams of neopentyl glycol monoallyl ether having a boiling point of 82° C. at a pressure of 20 mm. of mercury.

Example 10

This example describes the reaction of glycerol and allyl alcohol under conditions where only two of the three hydroxyl groups of glycerol were etherified.

A mixture of 31 grams (0.34 mol.) of glycerol, 70 grams (1.21 mol.) of allyl alcohol, 88 grams of benzene, 2.3 grams (10 milli-equivalents) of the sulphonated polystyrene of Example 4, and 0.25 gram (0.0025 mol.) of cuprous chloride, was refluxed in an atmosphere of nitrogen, using an apparatus fitted with a water-separating still head. The production of water had virtually ceased after 7 hours, and at the end of this time 20 cc. of water had separated.

The liquid product was decanted from the solid resin and distilled at atmospheric pressure to remove benzene and diallyl ether (the latter having been formed as a by-product from the excess allyl alcohol). Distillation of the residue under reduced pressure gave 48.5 grams of a fraction with a boiling range of 116–124° C. at 18 mm. of mercury pressure. This was shown by infrared spectroscopy and vapour phase chromatography to consist essentially of glycerol 1,2- and glycerol-1,3-diallyl ethers in the proportion of approximately 1:4. The iodine value of the product (that is the number of grams of iodine which react with 100 grams of the product) was 304. The calculated iodine value of glycerol diallyl ether is 295.

Example 11

This example describes the reaction of mannitol and allyl alcohol under conditions where three of the six hydroxyl groups of mannitol were etherified.

A mixture of 30 grams (0.17 mol.) of mannitol, 116 grams (2.0 mol.) of allyl alcohol, 88 grams of benzene, 6.9 grams (30 milli-equivalents) of the sulphonated polystyrene of Example 4, and 1 gram (0.01 mol.) of cuprous chloride, was stirred and boiled under reflux for 16 hours. A water-separating still head was then incorporated into the apparatus, and the water which had been formed during the reaction was removed as an azeotrope by continuing the refluxing for a further 4 hours.

The liquid product was decanted from the solid resin, and was freed from volatile material by holding for a period at a temperature of 100° C. and a pressure of 20 mm. of mercury. Diethyl ether was added and the solution of the product in ether was then washed with dilute aqueous ammonium hydroxide solution to separate any water-soluble material and copper salts. After drying the ethereal solution, the solvent was evaporated. The product thus obtained had a weight of 27 grams and was shown to consist essentially of mannitol triallyl ether. (Iodine value found, 259; calculated for mannitol triallyl ether, 254.)

Example 12

This example describes the reaction of allyl alcohol with a mixture of polyethylene glycols of average molecular weight approximately 200 (a) under conditions which gave largely a monoallyl ether and (b) under conditions which gave a mixture of mono- and di-allyl ethers with the latter predominating.

(a) A mixture of 100 grams (0.5 mol.) of the polyethylene glycol, 44 grams (0.86 mol.) of allyl alcohol, 88 grams of benzene, 2.3 grams (10 milli-equivalents) of the sulphonated polystyrene of Example 4, and 0.25 gram (0.0025 mol.) of cuprous chloride, was refluxed at a temperature of 80° C. in an apparatus fitted with a water-separating still head until the formation of water ceased. 17 grams of water were collected, and the reaction time was 9 hours. After removal of the catalyst, the product was distilled at a pressure of 1 mm. of mercury, when 118 grams of a distillate with a boiling range of 100–200° C. were collected. This had an iodine value of 103; the calculated iodine value for monoallyl ethers derived from a mixture of polyethylene glycols of average molecular weight 200 is 106.

(b) The process here differed from that described in (a) in that a larger amount (87 grams, 1.5 mol.) of allyl alcohol was employed, and the benzene was replaced by an equal weight of toluene, giving a reflux temperature of 98° C. Production of water ceased after 7 hours, during which time 30 grams had been collected. Distillation of the product gave 126 grams of a distillate with a boiling range of 80–180° C. at a pressure of 1 mm. of mercury, and an iodine value of 168. The calculated iodine value of diallyl ethers derived from a mixture of polyethylene glycols of average molecular weight 200 is 180.

The embodiments of the invention in which an exclusive property or privilege is claimed are defined as follows.

What is claimed is:

1. The method of preparing allyl ethers which comprises contacting an allyl alcohol with an aliphatic alcohol at a temperature of from about 60 to 150° C. in the presence of a catalyst consisting of a cuprous salt and an acid co-catalyst selected from the group consisting of phosphoric acid, boron trifluoride, aluminum chloride, sulphuric acid, sulphamic acid, benzenesulphonic acid, p- toluenesulphonic acid, methanesulphonic acid, ethyl hydrogen sulphate, sulphonated styrene ion-exchange resins; said cuprous salt being present in the proportion of from 0.001 to 0.1 mol per mol of allyl alcohol and said acid co-catalyst being present in the proportion of from 0.1 to 50 equivalents per mol of cuprous salt; wherein the said aliphatic alcohol has from 1 to 6 hydroxyl groups and is selected from the class consisting of substituted and unsubstituted aliphatic alcohols, wherein the substituted groups are selected from the class consisting of alkyls of from 1 to 4 carbon atoms, halogen, nitro and alkoxys of from 1 to 4 carbon atoms; said allyl alcohol having a structure corresponding to the general formula $$R_1\text{---}CH\text{=}CH\text{---}CHR_2\text{---}OH$$

wherein $R_1$ is a radical selected from the group consisting of hydrogen, the hydrocarbon radicals of the group consisting of alkyl having up to 20 carbon atoms, alkenyl having up to 20 carbon atoms, the cyclo-aliphatic radicals of the group consisting of cycloalkyl and cyclo-alkenyl radicals of 5 to 7 carbon atoms, phenyl radicals, the said cyclic radicals having alkyl substituents of up to 4 carbon atoms, phenyl alkyl having up to 10 carbon atoms, and the said hydrocarbon radicals containing substituents of the group consisting of nitro radicals, hydroxyl radicals, alkoxy and alkenoxy radicals of up to 4 carbon atoms and chlorine; and $R_2$ is selected from the group consisting of hydrogen and hydrocarbon radicals of the group consisting of alkyl radicals of up to 4 carbon atoms, alkenyl radicals of up to 4 carbon atoms and the said hydrocarbon radicals containing substituents of the group consisting of nitro radicals and alkoxy radicals of up to 4 carbon atoms, hydroxyl radicals and chlorine; and $R_1$ and $R_2$ taken together form an alkylene radical of from 2 to 4 carbon atoms.

2. The method of preparing allyl ethers according to claim 1 which comprises reacting an allyl alcohol to produce a diallyl ether.

3. The method of preparing allyl ethers according to claim 1 which comprises contacting allyl alcohol itself with an aliphatic alcohol having one to six hydroxyl groups.

4. The method of preparing allyl ethers according to claim 1 which comprises the use of an acid co-catalyst that is an acid ion-exchange resin containing a plurality of sulphonic acid groups.

5. The method of preparing allyl ethers which comprises contacting an allyl alcohol with an aliphatic alcohol at a temperature of from about 60 to 150° C. in the presence of a catalyst consisting of a cuprous salt and an acid co-catalyst selected from the group consisting of phosphoric acid, boron trifluoride, aluminum chloride, sulphuric acid, sulphamic acid, benzenesulphonic acid, p-toluenesulphonic acid, methanesulphonic acid, ethyl hydrogen sulphate, sulphonated styrene ion-exchange resins; said cuprous salt being present in the proportion of from 0.001 to 0.1 mol per mol of allyl alcohol and said acid co-catalyst being present in the proportion of from 0.1 to 50 equivalents per mol of cuprous salt; wherein the said aliphatic alcohol has from 2 to 6 hydroxyl groups and is selected from the class consisting of substituted and unsubstituted aliphatic alcohols, wherein the substituted groups are selected from the class consisting of alkyls of from 1 to 4 carbon atoms, halogen, nitro, and alkoxys of from 1 to 4 carbon atoms, such that etherification of the hydroxyl groups of the aliphatic alcohol is incomplete and there is produced an alkyl ether containing a free hydroxyl group; said allyl alcohol having a structure corresponding to the general formula $$R_1\text{---}CH\text{=}CH\text{---}CHR_2\text{---}CH$$

wherein $R_1$ is a radical selected from the group consisting of hydrogen, the hydrocarbon radicals of the group consisting of alkyl having up to 20 carbon atoms, alkenyl having up to 20 carbon atoms, the cycloaliphatic radicals of the group consisting of cycloalkyl and cyclo-alkenyl radicals of 5 to 7 carbon atoms, phenyl radicals, the said cyclic radicals having alkyl substituents of up to 4 carbon atoms, phenyl alkyl having up to 10 carbon atoms, and the said hydrocarbon radicals containing substituents of the group consisting of nitro radicals, hydroxyl radicals, alkoxy and alkenoxy radicals of up to 4 carbon atoms and chlorine; and $R_2$ is selected from the group consisting of hydrogen and hydrocarbon radicals of the group consisting of alkyl radicals of up to 4 carbon atoms, alkenyl radicals of up to 4 carbon atoms and the said hydrocarbon radicals containing substituents of the group consisting of nitro radicals and alkoxy radicals of up to 4 carbon atoms, hydroxyl radicals and chlorine; and $R_1$ and $R_2$ taken together form an alkylene radical of from 2 to 4 carbon atoms.

6. The method of preparing allyl ethers according to claim 5 which comprises contacting allyl alcohol itself with the aliphatic alcohol having from two to six hydroxyl groups.

7. The method of preparing allyl ethers according to claim 5 which comprises the use as the acid co-catalyst of an acid ion-exchange resin containing a plurality of sulphonic acid groups.

References Cited by the Examiner

UNITED STATES PATENTS

| | | | |
|---|---|---|---|
| 2,201,074 | 5/1940 | Britton et al. | 260—615 |
| 2,532,036 | 11/1950 | Roach et al. | 260—615 |
| 2,602,789 | 7/1952 | Schwartz et al. | 260—615 X |
| 2,847,477 | 8/1958 | Watanabe et al. | 260—611 |
| 2,847,478 | 8/1958 | Hwa et al. | 260—611 |

FOREIGN PATENTS 398,474    9/1933    Great Britain.

OTHER REFERENCES

Watanabe et al., Jour. of Org. Chem., vol. 23, No. 11 (1958), pp. 1666–1668.

LEON ZITVER, *Primary Examiner.*

CHARLES B. PARKER, *Examiner.*